Patented Oct. 5, 1954

2,691,028

UNITED STATES PATENT OFFICE 2,691,028

ESTRADIENE COMPOUNDS

Frank B. Colton, Chicago, Ill., assignor to G. D. Searle & Co., Chicago, Ill., a corporation of Illinois No Drawing. Application May 25, 1953, Serial No. 357,376

7 Claims. (Cl. 260—397.5)

The present invention relates to a new group of organic polycyclic compounds and more particularly, to the ethers of 3,17-dihydroxy-13-methyl - 1,4,6,7,8,9,11,12,13,14,16,17 - dodecahydro - 15H - cyclopenta[a]phenanthrenes, substituted in the 17-position by an ethynyl or vinyl radical. The compounds which constitute my invention can be represented by the following general structural formula

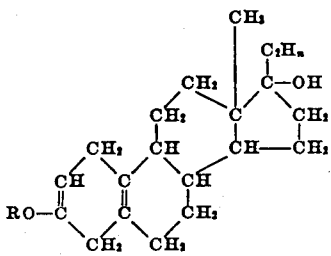

wherein R is a member of the class consisting of lower alkyl and lower phenylalkyl radicals and $n$ is either 1 or 3. Among the radicals which R can represent are methyl, ethyl, benzyl, straight and branch chained propyl, butyl, amyl, hexyl, phenethyl and phenylpropyl. The radical $C_2H_n$ is an ethynyl or a vinyl group.

The claimed compositions are valuable estrogenic agents. They also furnish drugs which are active in inhibiting allergic arteritis.

The claimed compounds are also valuable as intermediates in the synthesis of other medicinal agents. Cleavage of the ether linkage under mild acidic conditions yields the 17-ethynyl and 17-vinyl derivatives of 17-hydroxy-13-methyl-1,2,3,4,6,7,8,9,11,12,13,14,16,17 - tetradecahydro-15H-cyclopenta[a]phenanthrene - 3 - one. Convenient starting materials for these compounds are the ethers of 3-hydroxy-13-methyl-1,4,6,7,8,9,11,12,13,14,16,17 - dodecahydro - 15H - cyclopenta[a]phenanthrene-17-one described in my copending application, Serial No. 286,611, filed May 7, 1952, now Patent No. 2,655,518, of which the present application is a continuation-in-part.

The following examples illustrate in detail some of the procedures used in the practice of my invention and the compounds prepared thereby. However, this invention is not to be construed as limited by the details set forth in spirit or in scope. It will be apparent to chemists skilled in the art, that many modifications in materials and methods can be practiced without departing from the invention. In these examples temperatures are given in degrees centigrade (° C.) and relative amounts of materials in parts by weight.

Example 1

A stirred solution of 10.6 parts of 3-methoxy-13 - methyl - 1,4,6,7,8,9,11,12,13,14,16,17 - dodecahydro - 15H - cyclopenta[a]phenanthren - 17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous t-pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and after standing at 0° C. for an hour, the mixture is filtered. The collected precipitate is recrystallized from ether. The resulting 3-methoxy-13-methyl-17-ethynyl-1,4,6,7,8,9,11,12,13,14,16,17 - dodecahydro - 15H-cyclopenta[a]phenanthren-17-ol melts at about 181–182° C. The molecular rotation as determined in a 1% chloroform solution is $[\alpha]_D = +65°$. An additional amount of this product can be obtained from the mother liquors by concentration under vacuum followed by addition of petroleum ether. This compound has the structural formula

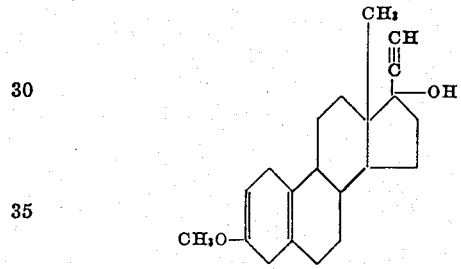

Example 2

To a refluxing solution of 10 parts of 3-methoxy - 17 - ethynyl - 17 - hydroxy - 13 - methyl-1,4,6,7,8,9,11,12,13,14,16,17 - dodecahydro - 15H-cyclopenta[a]phenanthrene in 500 parts of methanol, 20 parts of glacial acetic acid are added. Refluxing is continued for 7 minutes, water is added to the point of turbidity and the reaction mixture is permitted to come to room temperature. The precipitate is collected on a filter and recrystallized from aqueous methanol. The 13 - methyl - 17 - ethynyl - 17 - hydroxy - 1,2,3,4,6,7,8,9,11,12,13,14,16,17 - tetradecahydro - 15H-cyclopenta[a]phenanthren-3-one thus obtained melts at about 169–170° C. A 1% chloroform solution shows an optical rotation $[\alpha]_D = +108°$. The infrared absorption spectrum shows maxima at 2.78, 3.1 and 5.83 microns.

Example 3

A solution of 25.3 parts of 3 - methoxy - 13-methyl - 17 - ethynyl - 1,4,6,7,8,9,11,12,13,14,16,17-dodecahydro - 15H - cyclopenta[a]phenanthren-17-ol in 1900 parts of pyridine and 1600 parts of dioxane is reduced in an atmosphere of hydrogen over 25 parts of a catalyst, containing 5% palladium on calcium carbonate. The reaction is stopped on absorption of one molecule of hydrogen. The reaction mixture is filtered and the filtrate is concentrated to dryness. Upon repeated recrystallization from aqueous methanol the 3 - methoxy - 13 - methyl - 17 - vinyl - 1,4,6,7,8,9,11,12,13,14,16,17 - dodecahydro - 15H - cyclopenta[a]phenanthren-17-ol is obtained in crystals melting at about 156–157° C. The molecular rotation of a 1% chloroform solution is $[\alpha]_D = +111°$. The infrared absorption spectrum shows maxima at 2.78, 5.90 and 6.01 microns. This compound has the structural formula

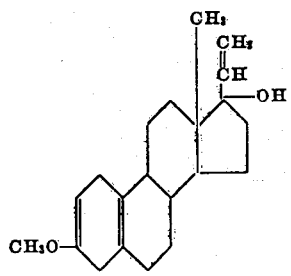

*Example 4*

An anhydrous solution of 20 parts of 3-benzyloxy - 13 - methyl - 1,4,6,7,8,9,11,12,13,14,16,17-dodecahydro - 15H - cyclopenta[a]phenanthrene-17-one in 1500 parts of ether and 100 parts of xylene is stirred and saturated with acetylene at a temperature of 0 to —5° C. While a slow stream of acetylene is passed through the mixture, a solution of 40 parts of potassium tertiary butylate in 275 parts of anhydrous tertiary butanol is added in the course of 20 minutes. Stirring and passage of acetylene are continued for 5 hours, after which the reaction mixture is stored at 0° C. for 5 hours. It is then washed successively with dilute ammonium chloride solution, water and saturated sodium chloride solution. The organic solution is dried over anhydrous calcium sulfate, filtered and evaporated under vacuum to yield the 3-benzyloxy-13-methyl-17-ethynyl - 1,4,6,7,8,9,11,12,13,14,16,17 - dodecahydro-15H-cyclopenta[a]phenanthren-17-ol. The infrared absorption spectrum of this compound shows maxima at 2.78, 3.00, 5.9 and 6.0 microns. This compound has the structural formula

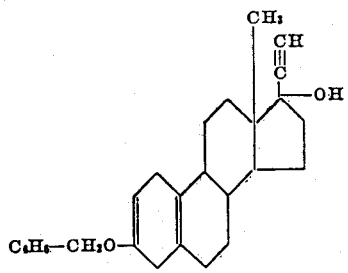

*Example 5*

In an atmosphere of hydrogen a solution of 5 parts of 3-benzyloxy - 13 - methyl - 17 - ethynyl-1,4,6,7,8,9,11,12,13,14,16,17 - dodecahydro - 15H-cyclopenta[a]phenanthren-17-ol in 400 parts of pyridine and 350 parts of dioxane is reduced over 5 parts of a 5% palladium-on-calcium carbonate catalyst. After absorption of one molecule of hydrogen, the hydrogenation is terminated and the reaction mixture is filtered. The filtrate is concentrated to dryness to yield the 3-benzyloxy - 13 - methyl - 17 - vinyl - 1,4,6,7,8,9,11,12,13,14,16,17 - dodecahydro - 15H - cyclopenta[a]phenanthren-17-ol. The infrared absorption spectrum of this compound shows maxima at 2.78, 5.9 and 6.0 microns. The compound has the structural formula

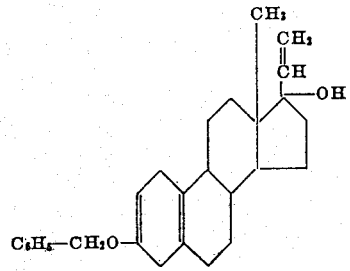

I claim:
1. A compound of the structural formula

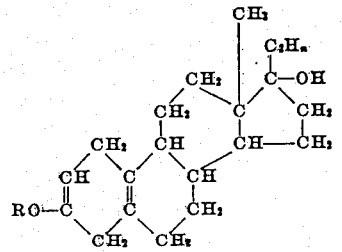

wherein R is a member of the class consisting of lower alkyl and lower phenylalkyl radicals and $n$ is an integer of the class consisting of 1 and 3.

2. A 3 - (lower alkoxy) - 13 - methyl - 17-ethynyl - 1,4,6,7,8,9,11,12,13,14,16,17 - dodecahydro-15H-cyclopenta[a]phenanthren-17-ol of the structural formula

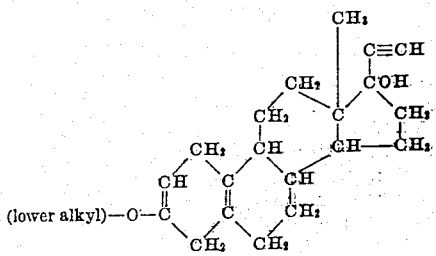

3. 3 - methoxy - 13 - methyl - 17 - ethynyl-1,4,6,7,8,9,11,12,13,14,16,17 - dodecahydro - 15H-cyclopenta[a]phenanthren-17-ol.

4. 3 - benzyloxy - 13 - methyl - 17 - ethynyl-1,4,6,7,8,9,11,12,13,14,16,17 - dodecahydro - 15H-cyclopenta[a]phenanthren-17-ol.

5. A 3 - (lower alkoxy) - 13 - methyl - 17-vinyl - 1,4,6,7,8,9,11,12,13,14,16,17 - dodecahydro-15H - cyclopenta[a]phenanthren - 17 - ol of the structural formula

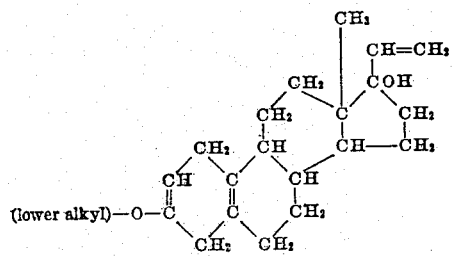

6. 3 - methoxy - 13 - methyl - 17 - vinyl - 1,4,6,7,8,9,11,12,13,14,16,17 - dodecahydro - 15H - cyclopenta[a]phenanthren-17-ol.

7. 3 - benzyloxy - 13 - methyl - 17 - vinyl - 1,4,6,7,8,9,11,12,13,14,16,17 - dodecahydro - 15H - cyclopenta[a]phenanthren-17-ol.

No references cited.